July 6, 1954
M. ERCHAK, JR
2,683,141
CONTINUOUS PRODUCTION OF WAX FROM ETHYLENE AND
NORMALLY LIQUID ORGANIC CO-REACTANT COMPOUND
Filed Feb. 6, 1952
2 Sheets-Sheet 1
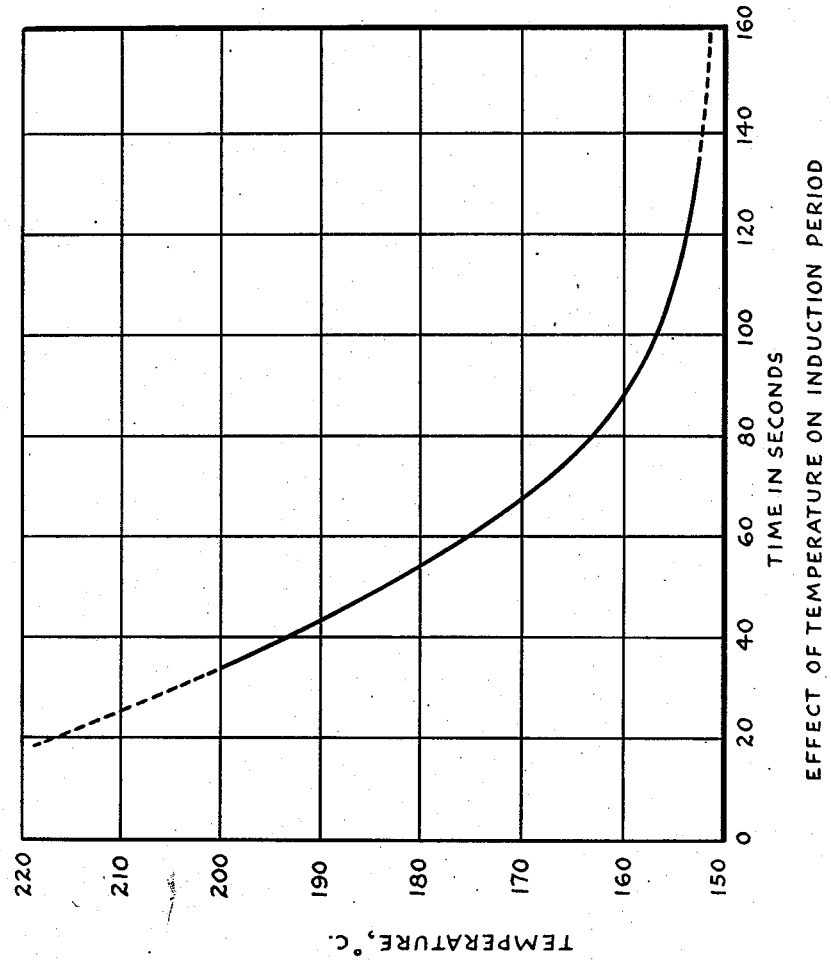
FIG.I.
INVENTOR.
MICHAEL ERCHAK, JR.
BY Robert A. Harman
ATTORNEY.

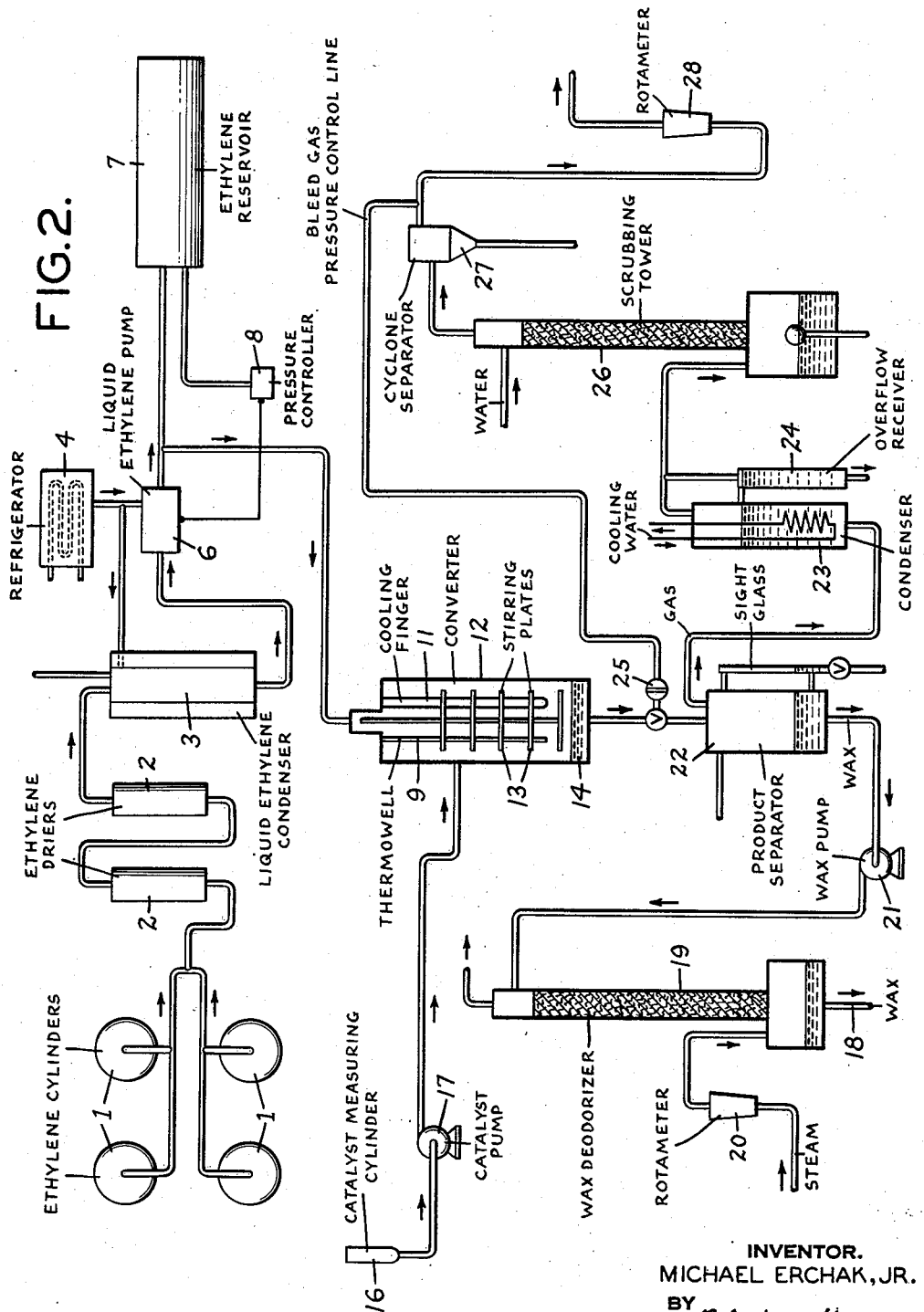

Patented July 6, 1954

2,683,141

UNITED STATES PATENT OFFICE 2,683,141

CONTINUOUS PRODUCTION OF WAX FROM ETHYLENE AND NORMALLY LIQUID ORGANIC CO-REACTANT COMPOUND

Michael Erchak, Jr., Morris Township, Morris County, N. J., assignor to Allied Chemical & Dye Corporation, New York, N. Y., a corporation of New York Application February 6, 1952, Serial No. 270,255

7 Claims. (Cl. 260—94.9)

This invention relates to continuous process for production of wax from ethylene and normally liquid organic co-reactant compound.

It is known that high molecular weight plastic polyethylene is formed from ethylene under suitable reaction conditions including high pressures such as 1000 atmospheres and up and temperatures suitably about 200° C. in presence or absence of free-radical forming catalyst. When carried out continuously, this reaction being highly exothermic presents problems of heat control adequate to avoid violent, run-away reactions and explosions; and presents problems of plugging the reaction zone and coating the thermowells and cooling coils with viscous or resinous polymer. Proposals made to overcome these problems include:

A. Use of a long, tubular reactor, wherein rapid flow rate of gas with relatively low conversion, not above about 20–25% per pass, maintains products largely or entirely dispersed or dissolved in the gas phase and thus minimizes plugging and temperature is controlled by the relatively large ratio of heat radiating surface:reactor volume and additionally is controlled by restricting the extent of conversion of ethylene per pass to about 20–25% or less and by adding any catalyst in successive portions injected down the length of the tube. In such processes, products and unreacted ethylene are separated externally of the reaction zone, ordinarily with reduction of ethylene pressure.

B. Use of a reactor filled almost completely with a liquid heat controlling reaction medium, suitably containing catalyst, through which ethylene is bubbled upward to polymerize it, the reaction temperature being less than about 150° C. to assure presence of liquid phase.

It is also known that waxes can be formed by reaction between ethylene and normally liquid organic compound free of olefinic unsaturation, e. g. consisting of carbon, hydrogen and oxygen, herein sometimes referred to as "saturated C—H—O compound"; also including aralkyl compounds such as toluene, ethylbenzene, cumene, n-propylbenzene, butylbenzenes, amylbenzenes, etc. The properties of these waxes such as solubility, viscosity, hardness, melting point, color, etc. are sensitive to reaction conditions including proportions of reactants and catalyst, temperature, pressure, and presence or absence of reaction media such as water as well as depending upon the particular co-reactant employed.

In a wax-producing process, conditions should be controlled to avoid run-away reaction, to get wax of good properties, and at the same time to avoid forming any substantial quanties of the above-mentioned high molecular weight plastic polyethylene, which if formed modifies the properties of the wax. In my experience, neither of the above described continuous reaction processes proposed for production of high molecular weight plastic polyethylene has proved satisfactory when attempts have been made to adapt it for continuous production of wax from ethylene and a co-reactant.

I have now found the wax from ethylene and normally liquid co-reactant can be satisfactorily produced in continuous and semi-continuous processes comprising the following reaction conditions:

1. Maintaining the reactants substantially entirely in vapor phase in the reaction zone, and maintaining in the reaction zone a separate molten wax phase (containing any dissolved and/or entrained constituents of the vapor phase) which molten wax phase preferably covers and seals the outlets from the reaction zone and is maintained substantially quiescent.

2. Introducing fresh ethylene, co-reactant, and catalyst at a rate which at least maintains thermally self-sustaining reaction and develops average temperatures throughout the vapor phase within the range between about 100° C. and about 300° C.; and at least for a time of the order of magnitude (i. e. for at least $\frac{1}{10}$) of the holdup time in the reaction zone, maintaining said temperatures constant within about ±10° C., preferably by aid of indirect interior cooling, e. g. cold finger, cooling coil, heat exchange vanes, etc., and preferably constant within ±5° C.

3. Maintaining pressures within the range between about 100 and about 1000 atmospheres, preferably constant within about ±4%.

4. Dispersing the input reactants and catalyst into the vapor phase, and intermixing them with gases and vapors already present, at rates maintaining temperatures at the hottest spots in the vapor phase not more than about 10° C. higher than the average temperatures in the vapor phase, preferably not more than about 5° C. higher; i. e. at rates maintaining temperatures throughout the vapor phase uniform within about ±10° C., preferably within about ±5° C.

5. Withdrawing wax from the reaction zone approximately at the rate at which it is formed, together with unreacted ethylene in weight ratios of wax : unreacted ethylene of at least about 1:1; preferably withdrawing only unreacted ethylene dissolved or entrained in the wax phase; and replacing reactants and catalyst withdrawn and consumed by introducing fresh reactants and catalyst into the reaction zone at rates maintaining their concentrations in the reaction zone approximately constant. Preferably the withdrawn ethylene gas contains not more than about 20 parts by weight of normally gaseous impurities per 100 parts by weight of exit gas, e. g. about 15 parts by weight of normally gaseous impurities and about 85 parts by weight of ethylene.

In my process above outlined, the problems of heat control and product quality maintenance are solved by use of conditions under which approximate uniformity and homogeneity can be established and maintained throughout the zone wherein reaction occurs. To this end, it is important that the reactants be substantially entirely in a single phase, i. e. in vapor phase. It is likewise important that dispersion and intermixing of incoming reactants and catalyst with gases and vapors already present be adequate to minimize differences in average temperatures compared to hot spot temperatures in the vapor phase as above specified.

Under conditions of inadequate dispersion and mixing, the co-reactant and catalyst are likely to build up to locally high concentrations e. g. near the inlets therefor and/or in the vicinity of interior cooling coils. Such concentration buildup will result in localized reactions with local conditions of concentrations and temperatures varying erratically and with accompanying non-uniformity of product.

The possibility of such localized reactions occurring is a particularly serious danger in connection with the reactions here involved since these reactions can show induction periods under the temperature and other conditions used; i. e. the decomposition of incoming fresh catalyst may start slowly and then gather speed even under constant temperatre and pressure conditions. Accordingly, concentrations of catalyst and co-reactant can build up locally while the induction period for catalyst decomposition lasts, and then the reaction can begin to accelerate. Greater reaction speeds produce (since the reaction is very exothermic) higher local temperatures which in turn result in still greater speed of reaction and widening local reaction zone; and if the local heat output reaches a point of exceeding the heat removal capacity over any considerable volume of the reactor the process can only end in an explosion.

To obtain adequate dispersion and mixing of the reactants and catalyst, agitators, baffles and the like can be used within the reaction vessel. Additionally or alternatively, the incoming reactants and catalyst (which is ordinarily introduced in liquid solution form, e. g. in an inert solvent or in the co-reactant) can be introduced at a plurality of points in the reactor, e. g. by use of a multi-hole inlet pipe or the like; and/or the incoming co-reactant and/or catalyst streams can be relatively cold compared to the average temperature in the reaction zone, so as to delay their reaction while they are being dispersed.

As above noted, the reactions here involved can show an induction period and in my process this induction period can be turned to advantage. According to a preferred embodiment of my process, reaction temperatures are maintained at which the reaction shows appreciable induction period (i. e. at least about 30 seconds time lag between start of catalyst injection into a reaction mixture under reaction conditions, and start of temperature rise as recorded by a thermocouple in the reactor). Dispersion of the fresh reactants and catalyst throughout the vapor phase in the reaction zone is substantially completed in a time period not exceeding the said induction period. Thereby the conditions under which the main reaction occurs can be maintained essentially uniform throughout the reaction zone.

Temperatures measured at various points throughout the vapor space in the reactor provide a good basis of control, manual or automatic, over the conditions of reaction in my process. If injection rate of co-reactant and catalyst is at least adequate at the operating ethylene pressure, the reaction will be thermally self-sustaining and will develop average temperatures throughout the vapor phase in the range between about 100° and about 300° C. If dispersion and mixing of the incoming reactants and catalyst are adequate, temperatures at the hottest spot in the vapor phase will not exceed the average temperature therein by more than at most 10° C., preferably not by more than about 5° C.

Average temperatures in the vapor phase should be kept constant, by provision of adequate cooling, within at most about ±10° C., preferably within about ±5° C. Greater variations, with other operating conditions maintained constant, tend to produce non-uniform products. Moreover if average temperatures rise much beyond the limit stated, with other conditions remaining constant, the reaction is likely to be thereby enough accelerated to produce heat beyond the heat removal capacity of the cooling system, which process will end in explosion. Indirect interior cooling is employed as an aid to temperature control since it is thereby possible to maintain pressures, concentrations, etc. substantially constant and avoid introducing an extraneous cooling liquid into the reaction zone.

Relatively long-term variations in average temperatures and other conditions, over periods at least of the order of magnitude of the reactor hold-up time, can be made if desired. Such variations can be counterbalanced by corresponding progressive changes in other conditions to maintain the original properties of the wax products, or can be employed to effect changes in the properties of the wax products. Generally speaking, increases in temperatures, proportions of co-reactant:ethylene, and proportions of catalyst:ethylene at constant ethylene pressures tend to produce softer waxes at higher rates and vice versa for harder waxes and lower rates. Higher pressures within the permissible ranges generally tend to produce harder waxes and at higher rates.

Under normal operating conditions I control reaction temperatures by (1) indirect interior cooling, (2) utilizing the heat of reaction to heat incoming materials to reaction temperatures and vaporize incoming liquids, and (3) heat loss through the reaction vessel walls, together with (4) dispersion as above described of incoming reactants and catalyst into the vapor phase. In case of emergency such as a sudden local or general temperature rise I can employ supplemental means of control such as cutting down or shutting off the catalyst and/or co-reactant supply, releasing pressure in the reactor, etc. It is preferred, however, to maintain these concentration and pressure conditions approximately constant as much of the time as possible since as above noted, they affect the properties of the wax product. Preferably concentrations of co-reactant are maintained constant within about ±5 parts by volume (measured as liquid at room temperatures) per 100 parts by volume of reaction zone space and catalyst is dissolved at approximately constant concentration in the incoming liquid co-reactant. Pressures are preferably maintained constant within about ±4% by admitting fresh ethylene into the reaction zone.

The induction period referred to above is demonstrated by the experimental results presented in Figure 1 which is a graph of results of typical wax-forming experiments wherein isopropanol occupying in liquid form at room temperature about 11% of the available reaction space was heated in a bomb with ethylene at pressures about 7000 p. s. i. to the reaction temperatures of the figure, and hydrogen peroxide catalyst in aqueous solution was then injected to initiate the reaction.

In the graph, the time intervals from injection of the catalyst until the induction period was over (as shown by a sharp rise of temperature and pressure in the reactor) have been plotted against temperatures maintained during the induction period, with otherwise constant conditions. At temperatures between about 160° C. and about 200° C., these induction periods appear, becoming progressively shorter the higher the heating temperature. Below about 160° C., the reaction rate during the induction period under the test conditions is excessively slow, so that reaction times are excessively long; and above about 220° C. under the test conditions, the period of initial slow reaction (the induction period) is so short as to be non-existent for practical purposes.

The precise upper and lower temperature limits at which the wax-forming reaction shows an induction period varies depending upon reactants, catalyst, and other conditions but nevertheless a range of average temperatures in which reaction with induction period appears is characteristic of wax-forming reactions of ethylene with saturated C—H—O compound or aralkyl compound.

A reaction zone with relatively great volume:wall area ratio, at least 1 cu. ft.:12 sq. ft., is preferred since among other advantages such reaction zone permits more ready dispersion of the incoming reactants throughout the reaction space and intermixing thereof with vapors already present than would be possible in a narrow tubular reactor. A cylindrical reactor having ratio of diameter to length between about 1:12 and about 1:4 is suitable.

Since it is desired in my process that the reactants be substantially entirely in vapor phase it follows high boiling organic co-reactants should be substantially absent. Accordingly, the co-reactant should boil below about 200° C. at 760 mm. Preferred saturated C—H—O compound co-reactants contain not more than 4 carbon atoms and not more than 2 oxygen atoms; and preferred aralkyl co-reactants contain not more than 2 alkyl side chains. Compounds which contain at least one CH or $CH_2$ group are generally more reactive than analogous compounds containing carbon combined with hydrogen in the form of only $CH_3$ groups. Compounds especially preferred have 2–4 aliphatic carbon atoms, not more than 2 oxygen atoms, and at least one CH or $CH_2$ group. Suitable compounds include alcohols e. g. methanol; ethanol; normal and isopropanols; primary, secondary and tertiary butanols; cyclohexanol; diacetone alcohol; also ethers, e. g. dimethyl, diethyl and diisopropyl ethers; also ketones e. g. acetone; methyl ethyl ketone; isobutyl ketones; cyclohexanone; also esters, e. g. methyl, ethyl, propyl and butyl formates, acetates, propionates, butyrates, malonates, orthoformates; also acids, e. g. acetic, propionic, and butyric acids; and the corresponding acid anhydrides and the corresponding aldehydes; also ethylene oxide; dioxolane; dioxane; methyl, ethyl, propyl, and butyl acetals; lactones; furanes; glycol diacetate, etc.; also toluene, ethylbenzene, cumene, n-propylbenzene, butyl benzenes; amyl benzenes, etc.

Properties of the wax products depend upon choice of co-reactant and also upon process conditions among which proportion of co-reactant and reaction pressures are important. Suitable proportions of co-reactant are usually in the range from about 1 to about 25 volumes of liquid co-reactant (measured at room temperatures) per 100 volumes capacity of the reaction vessel. Suitable reaction pressures are usually between about 100 and about 1000 atmospheres, preferably about 200–700 atmospheres. Excessive amounts of co-reactant and unduly low pressures tend to result in soft wax products, or liquids. Too little co-reactant tends to reduce yields; and too high pressures tend to produce toughness rather than waxiness in the product.

The ethylene employed can be commercial ethylene, say a 96% pure grade or a 99.5% pure grade or can be more highly purified if desired. The interrelation of ethylene purity with other operating variables is discussed in more detail below.

Temperatures employed must be high enough to assure presence of the desired concentration of co-reactant in the vapor phase, and substantial absence of a liquid phase of said co-reactant, under the operating pressure; but average temperatures preferably are not above the range in which, using the given catalyst, induction period appears in the reaction. Broadly speaking suitable average temperatures are in the range between about 100° C. and about 300° C., and generally are in the narrower range between about 140° C. and about 250° C., especially about 180°–200° C.

The catalyst chosen must be one which is sufficiently stable to produce reaction with induction period at temperatures such as about 100° C. or above; i. e. it must decompose non-explosively at the reaction temperatures and concentrations. Among suitable catalysts are peroxy catalysts, perhalo catalysts, azo catalysts, etc. moderately stable at 100° C. or above. Specific examples include hydrogen peroxide, acetyl peroxide, diethyl peroxide, lauroyl peroxide, benzoyl peroxide, cumene hydroperoxide, tertiary butyl hydroperoxide, di-tertiary butyl peroxide, molecular oxygen, benzalazine, acetone oxime, etc. Suitable catalyst proportions are from about 0.1 to about 10 percent by weight based on the weight of co-reactant which is injected into the reactor.

Under my process conditions, conversions of ethylene into wax can be carried to at least about 50% and more per pass; i. e. the weight ratio of wax:unreacted ethylene withdrawn from the reactor is at least about 1:1. Under my conditions the reaction is spread out over a sufficient volume of the reaction zone so that the heat produced even at 50% and higher conversions of ethylene per pass can be adequately removed, even without vaporizable heat control liquid present in the reactor. These high conversions offer an important operating advantage in that there is correspondingly smaller quantity of unreacted ethylene passed out of the system, or recycled after being repressured to operating pressures.

Moreover at ethylene conversions of 50% and more per pass I find that the average output of wax from a reactor of given volume, in pounds per hour, is actually higher than it is when lower ethylene conversions and correspondingly faster flow rates of the reactants are maintained. This observation may be connected with existence of induction periods in reactions in accordance with my process.

The optimum extent of conversion of input ethylene to wax per pass is dependent, among other things, on purity of the ethylene entering the reaction zone. When conversion of the input ethylene to wax is sufficient to produce not more than about 20 parts by weight of normally gaseous impurities (principally nitrogen, methane, ethane and propylene and usually small amounts of oxygen) in the ethylene-containing gas withdrawn from the reaction zone, rates of conversion of ethylene to wax are high. But above about 20 parts by weight of normally gaseous impurities per 80 parts of ethylene, further conversion of ethylene to wax becomes slower. Accordingly, conversions in my process are preferably carried to the point at which the exit gas contains, besides unreacted ethylene, not more than about 20 parts by weight of normally gaseous impurities per 100 parts of exit gas, e. g. about 15 parts by weight of normally gaseous impurities per 100 parts of exit gas.

The percent of ethylene conversion, $c$, at which normally gaseous impurities in the exit gas reach given percent by weight, $i$, depends upon the purity, $p$, of input ethylene in accordance with the following equations:

(1) $\quad i = 100 \times (100-p)/(100-0.01\ cp)$ where $i$ is parts by weight of impurities in 100 parts of exit gas, $p$ is parts by weight of ethylene in 100 parts of input gas and $c$ is percent of input ethylene converted to non-gaseous product (wax) per pass.

(2) $\quad c = (100\ i + 100\ p - 10{,}000)/(0.01\ ip)$ (3) $\quad p = (10{,}000 - 100\ i)/(100 - 0.01\ ci)$ For example, if the input ethylene is 99% pure, the extent of ethylene conversion to wax when the impurities reach 15 weight percent in the exit gas would be:

$c = (1500 + 9{,}900 - 10{,}000)/(0.15 \times 99)$
$= 94\%$.

Again, with 95% pure input ethylene, the extent of ethylene conversion when impurities reach 15 weight percent is:

$c = (1500 + 9{,}500 - 10{,}000)/(0.15 \times 95)$
$= 70\%$

For operation at $c=50\%$ conversion in accordance with that preferred embodiment of my process wherein impurities in the exit gas do not exceed $i=20\%$ by weight, the purity of the input gas, $p$, is:

$p = (10{,}000 - 100 \times 20)/(100 - 0.01 \times 50 \times 20)$
$= 89\%$

Thus it is seen that for operation in accordance with my process, the input ethylene is preferably at least about 90% pure on a weight basis.

Besides ethylene purity, another factor influencing the optimum value for the extent of ethylene conversion per pass in accordance with my process is the proportion of unreacted ethylene dissolved and entrained in the wax product withdrawn from the reactor. This dissolved and entrained ethylene is out of contact with the main vapor phase reaction mixture containing catalyst and co-reactant and therefore even if this ethylene contains a low percentage of impurities this ethylene dissolved and entrained in the wax phase reacts only slowly if at all.

Necessarily this unreacted ethylene is withdrawn from the reactor with the wax which is withdrawn. Accordingly when the input ethylene is of high purity the practical extent of ethylene conversion per pass may be limited by the factor of solution and entrainment of unreacted ethylene in the wax phase rather than by accumulation of impurities in the reacting gas. Evidently from the foregoing, it is desirable when employing a relatively pure input ethylene to minimize entrainment of ethylene in the wax phase.

As illustrated in the examples which follow, dissolved and entrained ethylene can readily be limited to about one part by weight per 3–4 parts by weight of product, corresponding to 75–80% conversion of ethylene. Conversions can be carried as high as 90% although at such conversions, wax may tend to accumulate in the reaction zone more rapidly than it is being withdrawn, i. e. an unduly long residence time of wax in the reaction zone may be required to reduce the content of entrained unreacted ethylene in the wax to a point corresponding to only 10% of the input ethylene.

The only gas withdrawn from the reaction zone in accordance with preferred operation of my process is gas dissolved and entrained in the wax product, and is about 85% by weight of ethylene and about 15% by weight of normally gaseous impurities with extent of ethylene conversion per pass being at least about 70%. In such mode of operation the purity of input ethylene must correspond, in accordance with the equations above set out, to formation of exit gas with about 15 weight percent of impurities, at the conversion obtained. Accordingly if the fresh ethylene supply is of greater purity than required for operation to about 15% exit gas impurities at the particular conversion being obtained, a portion of the exit gas can be combined with incoming fresh ethylene to form an input ethylene of purity which results in 15 weight percent of impurities in the exit gas at the ethylene conversions per pass being obtained.

To prevent escape from the reaction zone of gas other than gas dissolved and entrained in the outgoing wax, the wax phase should cover the outlets from the reaction zone forming a liquid seal, and should be agitated only mildly, if at all.

A form of apparatus in which my process has been successfully carried out is diagrammatically illustrated in the flow sheet designated Figure 2.

The following examples are illustrative of operation of my process, reference being made to Figure 2; but are not to be interpreted as limiting the invention by illustrative details.

*Example 1.*—Ethylene of 96% purity was withdrawn from ethylene storage cylinders 1 and passed via driers 2 into the refrigerated condenser 3, cooled by refrigerator 4, in which ethylene condenses to a liquid. Pressures in condenser 3 were maintained between 400 and 1200 p. s. i., and temperatures were maintained between 0° and −40° C. The ethylene was then delivered by pump 6 to a reservoir 7 where it was stored under pressure of about 6200 p. s. i. at room temperature in gaseous form.

After 40–45 pounds of gaseous ethylene was led from reservoir 7 to the cylindrical converter 12 of 10 inch diameter and 40 inch length with about 55 liters capacity, which was maintained at about 197.5° C. average temperature and about 200° C. hot spot temperature as measured in the thermowell 9. The pressure was about 5000 p. s. i. A solution of 4500 cc. of 0.5% $H_2O_2$ and 0.5% water (by volume) in isopropanol was then injected from measuring cylinder 16 by means of catalyst pump 17; and the converter 12 was connected to the high pressure reservoir 7. Reaction started and as it proceeded, wax collected at the bottom of the converter and was withdrawn into product separator 22. The rate of withdrawal was controlled so that a layer of wax 14 always remained on the bottom of the converter 12.

Off gases and vapors were bubbled up through condensate in condenser 23 and passed through scrubbing tower 26 wherein they were scrubbed with water to remove any remaining condensable material. The rate of bleeding off gases was controlled by diaphragm 25.

About 1300 to 1700 liters of ethylene (3.5 to 4.5 lbs.) was withdrawn per hour as shown by measurements with rotameter 28, along with 15 to 20% normally gaseous impurities; plus condensate, consisting primarily of water and isopropanol, amounting to about 1 to 1.5 lbs. per hour, withdrawn via overflow receiver 24 and in tower 26; plus wax amounting to about 14 lbs. per hour. The wax was delivered by pump 21 to packed deodorizing column 19 wherein it was countercurrently contacted with steam entering through rotameter 20.

Deodorized wax product was withdrawn from tower 19 via line 18.

The reaction mixture was stirred by means of a churn type agitator 13 and temperatures were maintained within ±2.5° C. by means of cooling water circulating through finger 11 in response to automatic control. Additional ethylene was fed automatically and substantially continuously in response to pressure drop in the converter from reservoir 7 which was maintained at 6200 p. s. i. ±100 p. s. i. by action of pressure controller 8, thus maintaining pressures in converter 12 substantially constant at about 6100 p. s. i. A uniform reaction rate was maintained by continuously injecting about 750 cc. per hour of make-up 3% $H_2O_2$—3% water (by volume) in isopropanol.

The resulting wax had penetration hardness of about 0.04 cm. when tested at room temperature (20–25° C.) with an ASTM needle with load of 200 grams for 10 seconds; viscosity in Saybolt Furol seconds at 140° C. of about 45 seconds and solidification point, as determined by the ASTM method for paraffin waxes, of about 103° C. (In the above hardness tests, substantially the same results are obtained with 5 second, 10 second, and 30 second application of the load.)

*Example 2.*—A continuous run of 48 hours duration was carried out as in Example 1 above except that average temperatures were about 180 to 185° C. At these temperatures, a rate of injecting isopropanol-aqueous hydrogen peroxide solution of 650 cc. per hour instead of 750 cc. per hour as in Example 1 proved enough to maintain desired reaction conditions and replace catalyst and isopropanol which were consumed and/or withdrawn—dissolved and/or entrained—in the wax product.

The resulting wax, obtained at a rate of 10–12 lbs. per hour with ethylene conversions of better than 75 percent per pass (giving about 15% exit gas impurities), had hardness in the above penetration test of 0.02 cm. and was of pure white color.

In the examples, the feed of reactants and withdrawal of products and unreacted starting materials is continuous, but if desired intermittent feed and/or withdrawal can be used, whereby values of operating conditions fluctuate about desired average values (semi-continuous operation).

When substituting other co-reactants and/or cataysts for those of the above examples a different balance of co-reactant injection rate and/or catalyst concentrations may be required under like temperature and pressure conditions for best yields of good quality wax. For example if acetone is employed as co-reactant under otherwise the conditions of Example 1, an injection rate of about 1000 cc. per hour is suitable.

The following example illustrates use of an aralkyl hydrocarbon co-reactant.

*Example 3.*—The procedure of this example was essentially as in Example 1 above, except for differences specifically pointed out in the description which follows.

Instead of isopropanol, one liter of cumene was charged into converter 12. The pressure was brought up from 3000 p. s. i. to 6700 p. s. i. by admitting ethylene from reservoir 7 into converter 12; the temperature was maintained at 190°–196° C.; and cumene containing 2.5% by weight of cumene hydroperoxide was injected at a rate of 800 cc. per hour, by catalyst pump 17, into converter 12.

The wax product thus obtained had penetration hardness, measured as above, of about 0.05–0.06 cm. and was formed at a rate of about 10 pounds per hour. Conversion per pass was about 75–80% of ethylene introduced. Viscosity in Saybolt Furol seconds at 140° C. was about 80 seconds.

Modifications in the procedures and apparatus referred to in the above examples will be obvious to those skilled in the art. For example surge tanks, control instruments, control valves and the like can be employed as indicated in the diagram or otherwise to facilitate smooth operation.

This application is a continuation-in-part of my copending application Serial No. 250,035, filed October 5, 1951 for Waxy Additive For Upgrading Paraffin Waxes.

I claim:

1. A process for production of wax from ethylene and a co-reactant as defined below which comprises maintaining an ethylene and co-reactant vapor phase and a separate molten wax phase therebeneath in a polymerization reactor; introducing into the vapor phase, at rates maintaining their concentrations in the reaction zone approximately constant, ethylene, ethylene polymerization catalyst, and a normally liquid organic co-reactant compound boiling not above about 200° C. at 760 mm. of the group consisting of saturated compounds of carbon, hydrogen and oxygen, and aralkane compounds; maintaining the reactor at a pressure between 100 and 1000 atmospheres; and by maintaining a state of turbulence in the vapor phase in the reactor and controlling the rate of catalyst and coreactant input and rate of removal of heat from the reactor, maintaining average temperatures throughout the vapor phase within the range 100° C. to 300° C. and maintaining temperatures at the hottest spots in the vapor phase not more than about 10° C. higher than the average temperatures in the vapor phase; maintaining the aforesaid separate molten wax phase in the reactor substantially quiescent; and withdrawing wax from the wax phase approximately at the rate at which it is formed and withdrawing unreacted ethylene in weight ratios of wax:unreacted ethylene of at least 1:1.

2. Process for production of wax from ethylene and a normally liquid organic compound co-reactant boiling not above about 200° C. at 760 mm., of the group consisting of saturated compounds of carbon, hydrogen and oxygen and aralkane compounds, which process comprises introducing said reactants and catalyst for their reaction into a reaction zone wherein at least for about $\frac{1}{10}$ of the hold-up time in said reaction zone, average temperatures developed in the vapor phase, in the range between about 100° C. and about 300° C., are maintained constant with the aid of indirect interior cooling within ± about 10° C. and pressures are maintained substantially constant within about ±4.0% and within the range between about 100 and about 1000 atmospheres; maintaining in the reaction zone a vapor phase and a separate molten wax phase; dispersing the input reactants and catalyst into the vapor phase and intermixing them with gases and vapors already present at rates maintaining temperatures at the hottest spots in the vapor phase no more than about 10° C. higher than the average temperatures in the vapor phase; withdrawing wax from the wax phase in the reaction zone approximately at the rate at which it is formed, together with unreacted ethylene in weight ratios of wax:unreacted ethylene of at least about 1:1, and continuing introduction of reactants and catalyst into the reaction zone at rates maintaining their concentrations in the reaction zone approximately constant.

3. Process as defined in claim 2 wherein conversions of ethylene to wax per pass are carried to at least about 70% and exit gases contain not more than about 20 parts by weight of normally gaseous impurities per 80 parts of unreacted ethylene.

4. Process as defined in claim 3 wherein substantially the only gas withdrawn from the reaction zone is gas dissolved and entrained in the wax product.

5. Process as defined in claim 3 wherein temperature difference between average temperatures in the vapor phase and temperatures at the hottest spot thereof are not greater than about 5° C., and reaction temperatures are in the range in which the reaction shows induction period of at least about 30 seconds.

6. Process as defined in claim 5 wherein the organic co-reactant compound has at least one of the groups CH and $CH_2$, reaction temperatures are in the range between about 140° and about 250° C., and pressures are in the range between about 200 and 700 atmospheres.

7. Process as defined in claim 6, wherein the ethylene introduced into the reaction zone is at least about 90% pure on a weight basis; the organic coreactant compound is isopropanol; the catalyst is hydrogen peroxide at concentrations in the range between about 0.1 and about 10 percent by weight based on the weight of isopropanol introduced into the reactor; the average temperatures in the reaction zone are in the range between about 180° and about 200° C.; and quantities of isopropanol maintained in the reaction zone are in the range from about 1 to about 25 volumes measured as liquid at room temperature per 100 volumes capacity of the reaction zone.

No references cited.